Figure 1:
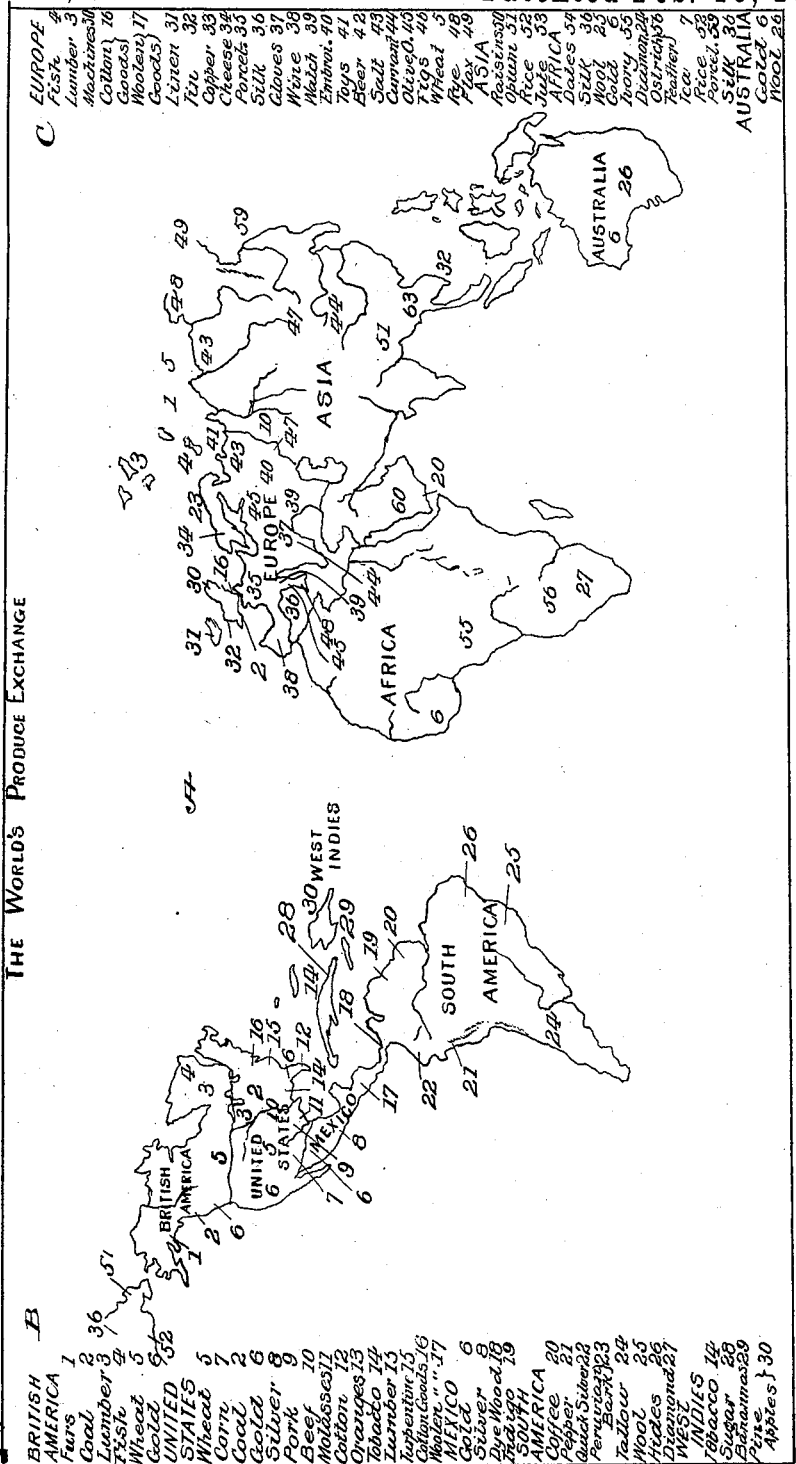

(No Model.) 2 Sheets—Sheet 2.
K. A. STURGES & I. LEAYCRAFT.
GAME APPARATUS.
No. 599,025. Patented Feb. 15, 1898.
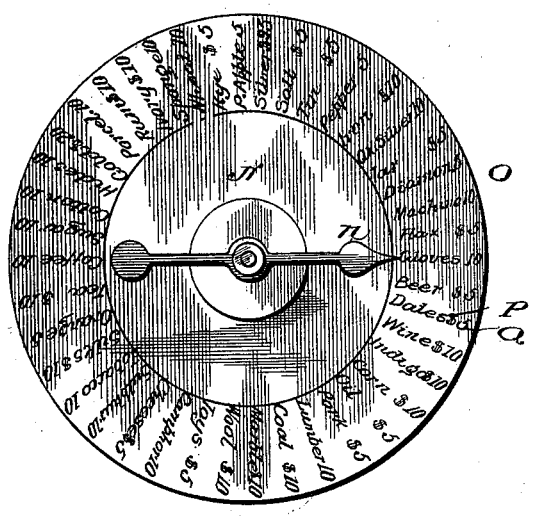
*Fig. 2.*
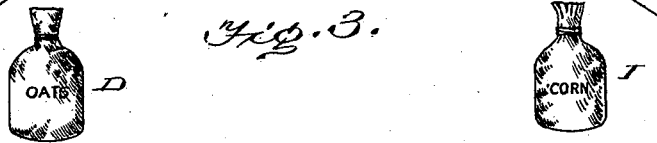
*Fig. 3.*
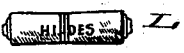
Witnesses
E. S. Poole
Inventors
Ida Leaycraft.
Katherine A. Sturges.
by Their Attorney

UNITED STATES PATENT OFFICE.

KATHERINE A. STURGES, OF WILTON, AND IDA LEAYCRAFT, OF NORWALK, CONNECTICUT.

GAME APPARATUS.

SPECIFICATION forming part of Letters Patent No. 599,025, dated February 15, 1898.

Application filed April 28, 1897. Serial No. 634,273. (No model.)

*To all whom it may concern:*

Be it known that we, KATHERINE A. STURGES, a citizen of the United States, residing at Wilton, and IDA LEAYCRAFT, a subject of the Queen of Great Britain, residing at Norwalk, in the county of Fairfield, State of Connecticut, have invented certain new and useful Improvements in Game Apparatus, of which the following is a description, reference being had to the accompanying drawings, and to the letters of reference marked thereon.

Our invention comprises a new and original game which we have entitled the "World's Produce Exchange," for the reason that it is played with an apparatus comprising maps correctly showing different geographical divisions or countries of the world and with small representations of the products of said countries. Each product is also correctly labeled, and on either side of the map are written names of the different countries or divisions, with a list of their various products. The products of the list are numbered, and numbers corresponding to these are placed upon the map, showing thereby the correct geographical positions of product. An indicator with a freely-moving hand is provided with a list of products. Each product on the indicator is given a value in numbers, written with the dollar-sign, which price represents the money value given in exchange for the products. The indicator when put in motion will stop opposite one or the other of these products. If the product which the indicator stops at is in the country or division of the player, he marks the price or number specifying the value of the product on the credit side of the tally. If the product which the indicator stops at is not in the country of the player, the loss is marked on the debit side of the tally. The player first scoring the designated total wins the game.

The object of our invention is not only to produce a new and entertaining game, but at the same time one which carries with it a useful study and which will be highly valuable in kindergartens and schools, as it is calculated to extend and fix the knowledge of geography in the mind, together with useful information concerning the chief products of the various countries. It also supplements the study of arithmetic in a pleasing manner.

The illustration accompanying the application shows the general principle of the invention and is sufficient for the explanation thereof; but it will be understood that only a few of the principal products of the several countries are enumerated, and that for purposes of study the apparatus may be simplified or may be extended to a much greater extent, that instead of maps representing the world a map embodying one country or division of a country may be used, in which instance the counters will be more numerous and indicate each of said products, as in the present instance, by some characteristic of form or marking. By this arrangement a geographical study can be extended from that of the principal products of the whole world to the specific products of specified divisions thereof and a regular course of instruction be pursued in a new and entertaining manner.

In addition to the general designations shown in the accompanying map by way of illustration when lesser territory is employed upon an increased scale of illustration not only are the products marked upon said map, but they are also located as nearly as possible at the points upon said territory which are the chief sources of the product indicated.

In the accompanying drawings, Figure 1 is a plan view of the principal geographical divisions of the world, including also two indexes of the principal products thereof. Fig. 2 is a plan view of the indicator. Fig. 3 is a view showing in elevation representations of the various products in the form of counters.

In Fig. 1 A represents the different countries of the world, each one of which is provided with two or more numbers.

B and C are indexes enumerating under headings designating the different countries the names of the different products thereof, the name of each product being followed by a number, which number corresponds with the numbers upon the map.

Fig. 3 shows a number of counters, as follows: D is a sack marked "Oats," which is preferably made of fabric and stuffed and tied at the top to represent a sack. E is a small barrel which would ordinarily be turned from a piece of wood and ornamented as desired. This is marked "Oil." F indicates a small box which is marked "Tea." G is another small sack, marked "Wheat." H is another barrel, marked "Tobacco," which may be of a different color from the barrel representing oil. I is another sack, marked "Corn." J is a small barrel marked "Molasses." K is a box marked "Oranges," which is preferably made of oblong form to resemble the orange-box of commerce. L is a counter made in the form of a roll and is marked "Hides." M is another barrel marked "Sugar." These counters may be made of any material, although we prefer to embody in their construction some indication of the substances represented whenever that can conveniently be done.

Fig. 2 shows an indicating device which comprises a base N, in the center of which is pivotally mounted a freely-rotatable hand $n$. In a circle around the hand are arranged the names of the different products, as at P, with a price-list Q opposite each. The hand is turned and thereby set in motion, and when its momentum is exhausted the name of the product nearest the pointer $n$ is announced and the player holding the same will place the counter representing it upon the map where indicated by the tally-numbers, scoring the price assigned upon the indicator to the counter. As shown in said Fig. 2, the pointer has stopped in front of "Gloves," opposite which appears the sum of "$10.00," which is the amount to be added to the score of the player in whose country gloves are made. The hand or pointer $n$ is then again started, and the product nearest to which it stops is again announced and the player holding the counter scores, and so on. The player first reaching the designated total score wins the game.

The indicator may be operated by a person not playing the game, but the usual method is for each player to spin the indicator in turn. If the player whose turn it was to spin the indicator is operating the territory in which the product indicated is found, he places the counter indicating said product upon the map at the point indicated by the corresponding number or mark upon the map and upon the counter and adds to his score the value assigned to said product upon the indicator, and the player first tallying the designated total wins the game. In many instances both debit and credit are employed, so that in case the indicator stops nearest to a product not emanating from the country assigned to the player whose turn it was to spin the indicator he will debit himself with the price of the product, and the game may be played by the person holding the territory producing the product called for by the spin of the indicator by any other player crediting the value thereof to his score, while the player spinning the indicator debits himself with a like amount.

Only a few of the products marked upon the indicator and enumerated in indexes B and C are shown in Fig. 3; but they are sufficient for illustration, it being understood that counters will be provided to represent any and all products which the game may be made to include.

The geographical features of the game, together with products of the several countries, are the leading features of the invention, and these we claim, broadly. It will be obvious, however, that various modifications may be made in view of the foregoing without the exercise of invention.

We claim—

1. A game comprising a chart or charts representing geographical divisions or countries, each provided with tally-marks, counters indicating the products of said countries and each marked to correspond with the tally-marks upon a chart, and an indicator adapted to arbitrarily designate one product at a time.

2. A game comprising a chart or charts representing geographical divisions or countries, each provided with tally-marks, counters indicating the products of said countries and each marked to correspond with the tally-marks upon a chart, and an indicator adapted to arbitrarily designate one product at a time, and also a number or value, which latter constitutes the score.

3. A game comprising a map or chart showing geographical divisions or countries, each country provided with numbers, an index showing the products of said countries, each product bearing a number corresponding with numbers upon the map indicating the country where it is produced, counters indicating the products of said countries, and an indicator adapted to arbitrarily designate one product at a time, and also a number or value, which latter is credited or adapted to the score.

4. A game comprising a chart or charts representing geographical divisions or countries, each provided with tally-marks, counters formed or marked to indicate different products of said countries, and an indicator adapted to arbitrarily designate one product at a time, and also a number or value, which latter constitutes the score.

5. A game comprising a map or chart showing different geographical divisions or countries, each country provided with tally-marks, an index showing the products of said countries, each product bearing a mark corresponding with those on the map indicating the country where it is produced, counters indicating the products of said countries, and an indicator comprising a list of said products, and a score-number for each product, and a movable device adapted to be operated by each player in turn to arbitrarily designate one product at a time, the number of which is credited or adapted to the score of the player operating the indicator.

In testimony whereof we affix our signatures in presence of two witnesses.

KATHERINE A. STURGES.
    IDA LEAYCRAFT.

Witnesses:
    MAE CHOLWELL PRICE,
    HENRY P. PRICE.